US007868862B2

(12) United States Patent
Lee et al.

(10) Patent No.: US 7,868,862 B2
(45) Date of Patent: Jan. 11, 2011

(54) LIQUID CRYSTAL DISPLAY

(75) Inventors: Dong Hoon Lee, Anyang-si (KR); Sun Hwa Lee, Gunpo-si (KR); Yong Woo Choi, Ansan-si (KR)

(73) Assignee: LG Display Co., Ltd., Seoul (KR)

( * ) Notice: Subject to any disclaimer, the term of this patent is extended or adjusted under 35 U.S.C. 154(b) by 1074 days.

(21) Appl. No.: 11/607,306

(22) Filed: Dec. 2, 2006

(65) Prior Publication Data
US 2007/0126677 A1 Jun. 7, 2007

(30) Foreign Application Priority Data

Dec. 2, 2005 (KR) .................... 10-2005-0117061

(51) Int. Cl.
*G09G 3/36* (2006.01)
(52) U.S. Cl. .................... 345/88; 345/204; 345/89; 345/87; 345/77; 345/694; 358/51.8
(58) Field of Classification Search .................. 345/690, 345/88, 604, 597
See application file for complete search history.

(56) References Cited

U.S. PATENT DOCUMENTS

| 4,825,203 | A  | * | 4/1989 | Takeda et al. .................. 345/88 |
| 7,268,757 | B2 | * | 9/2007 | Ben-David et al. ............ 345/88 |
| 7,545,395 | B2 | * | 6/2009 | Kurumisawa ............... 345/690 |

| 2002/0041457 | A1 | * | 4/2002 | Liang et al. .................. 359/885 |
| 2004/0100433 | A1 | * | 5/2004 | Ham ............................ 345/89 |
| 2005/0264587 | A1 |   | 12/2005 | Kurumisawa |
| 2006/0007077 | A1 | * | 1/2006 | Joo et al. ....................... 345/77 |

FOREIGN PATENT DOCUMENTS

JP 2001-125091 5/2001

OTHER PUBLICATIONS

Notification of First Office Action for corresponding Chinese Patent Application Serial No. 2006101528994, dated Feb. 22, 2008.
Second Office Action issued in corresponding Chinese Patent Application No. 2006101528994; mailed Jun. 13, 2008.

* cited by examiner

*Primary Examiner*—Sumati Lefkowitz
*Assistant Examiner*—Grant D Sitta
(74) *Attorney, Agent, or Firm*—Brinks Hofer Gilson & Lione

(57) ABSTRACT

A liquid crystal display is provided. The liquid crystal display includes a plurality of first pixels provided with RGB color filters and a plurality of second pixels provided with CMY color filters are formed at a liquid crystal display panel. A video processing part is inputted with RGB data to generate CMY data, and selectively outputs RGB data inputted in accordance with a clock signal and CMY data generated in accordance with a clock signal. A control part controls a supply of RGB data or CMY data inputted from the video processing part in accordance with the clock signal. In accordance with a control part, a data driving part converts RGB data or CMY data outputted from the control part into an analog data, and then supplies it to the plurality of first pixel or the plurality of second pixel.

4 Claims, 8 Drawing Sheets

LIQUID CRYSTAL DISPLAY

This application claims the benefit of Korean Patent Application No. P05-0117061 filed in Korea on Dec. 2, 2005, which is hereby incorporated by reference.

BACKGROUND

1. Field

The present embodiments relate to a liquid crystal display.

2. Related Art

Generally, a liquid crystal display controls light transmittance of liquid crystal cells in accordance with video signals to thereby display a picture. An active matrix type of liquid crystal display having a switching device provided for each liquid crystal cell moves the picture by permitting an active control of the switching device. The switching device used for the active matrix liquid crystal display mainly employs a thin film transistor (hereinafter, referred to as "TFT") as shown in FIG. 1.

Figure 1:
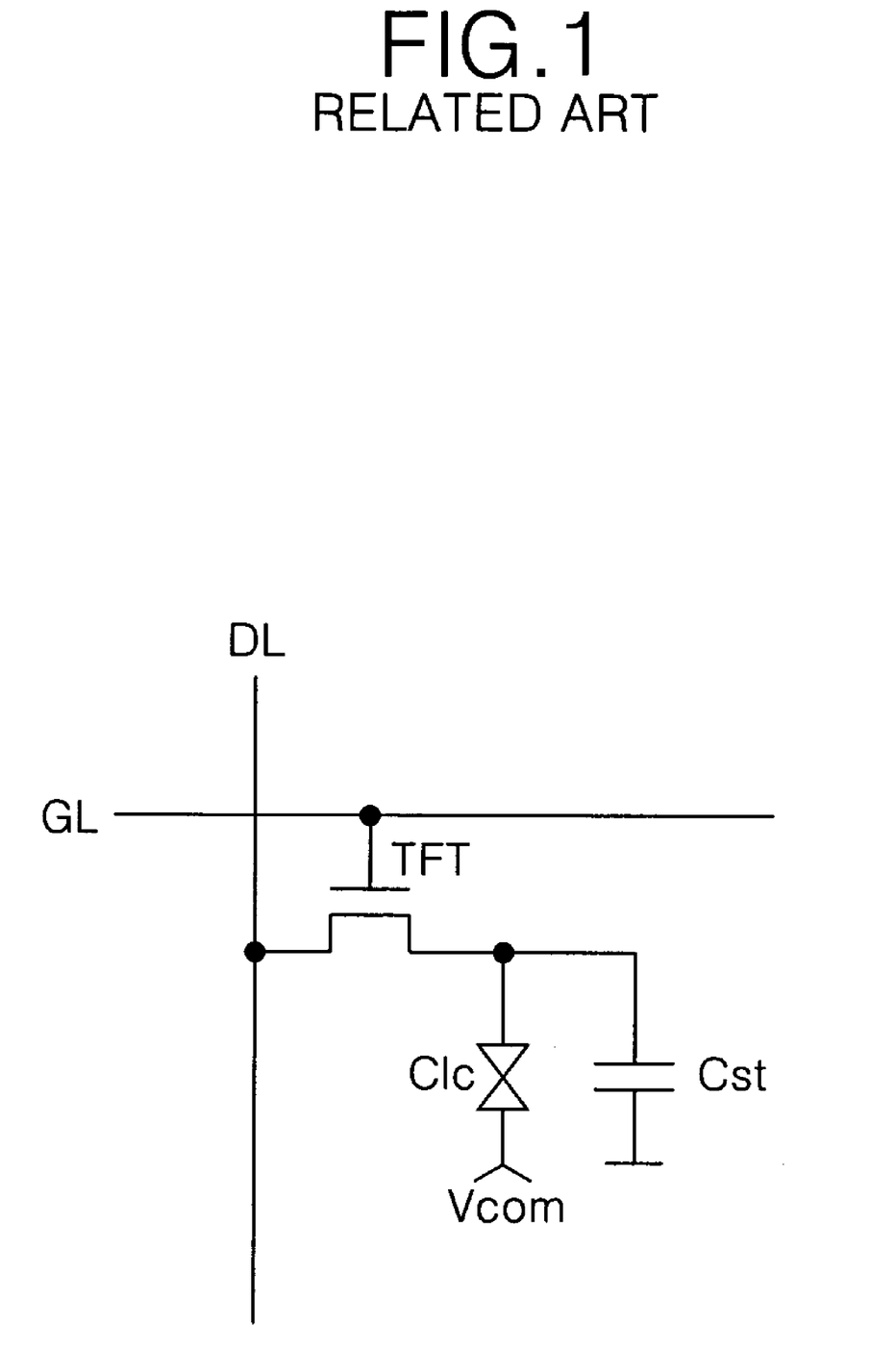
FIG. 1 is an equivalent circuit diagram of a pixel provided at a related art liquid crystal display.

Referring to FIG. 1, the active matrix LCD converts a digital input data into an analog data voltage on the basis of a gamma reference voltage and supplies it to a data line DL. At the same time, the active matrix LCD supplies a scanning pulse to a gate line GL to thereby charge a liquid crystal cell Clc.

A gate electrode of the TFT is connected to the gate line GL while a source electrode thereof is connected to the data line DL. A drain electrode of the TFT is connected to a pixel electrode of the liquid crystal cell Clc and to one electrode of a storage capacitor Cst.

A common electrode of the liquid crystal cell Clc is supplied with a common voltage Vcom.

The storage capacitor Cst charges a data voltage fed from the data line DL when the TFT is turned-on, thereby constantly maintaining a voltage at the liquid crystal cell Clc.

If the scanning pulse is applied to the gate line GL, then the TFT is turned on to provide a channel between the source electrode and the drain electrode thereof, thereby supplying a voltage on the data line DL to the pixel electrode of the liquid crystal cell Clc. Liquid crystal molecules of the liquid crystal cell have an alignment changed by an electric field between the pixel electrode and the common electrode to thereby modulate an incident light.

Figure 2:
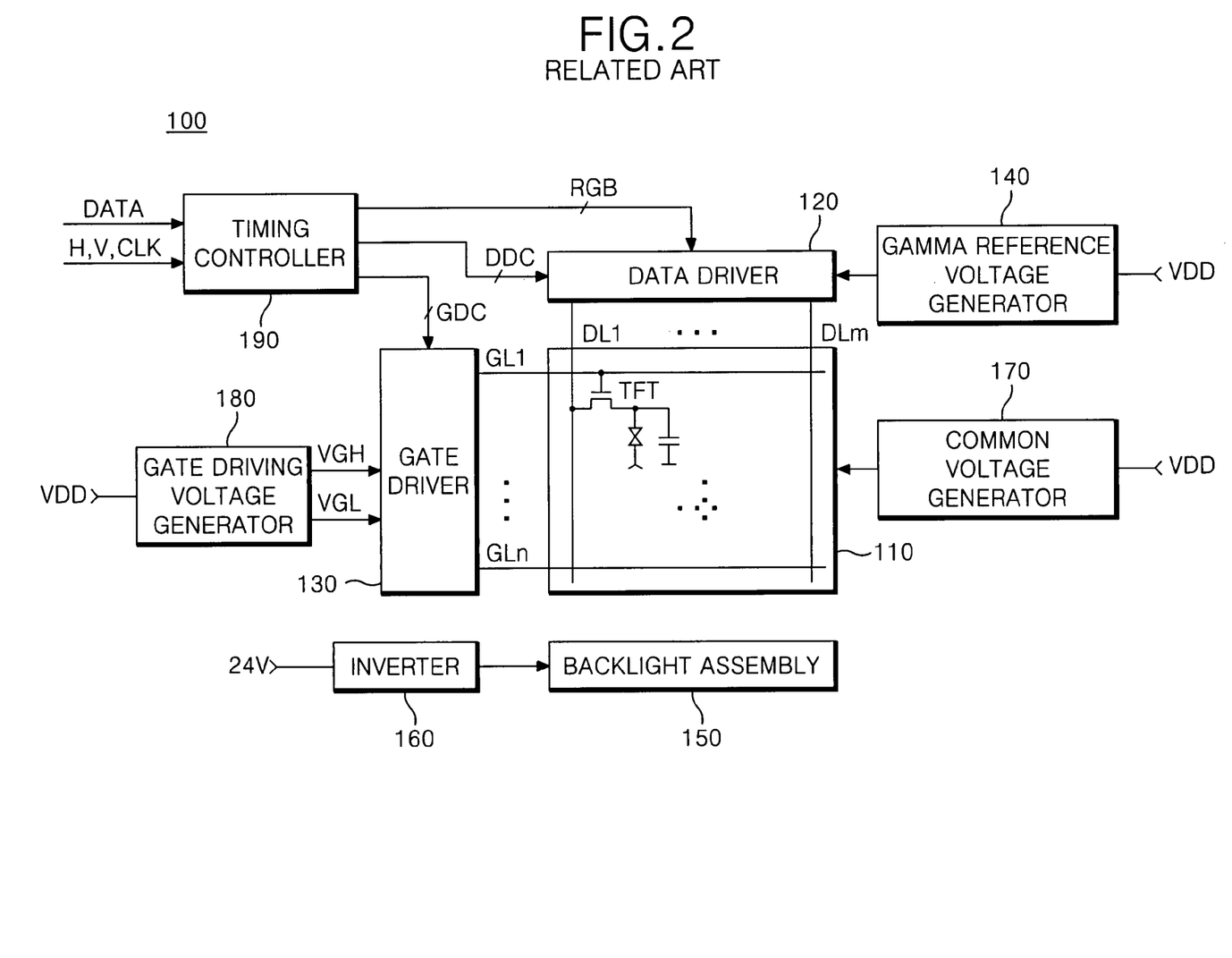
FIG. 2 is a block diagram showing a configuration of a related art liquid crystal display.

FIG. 2 is a block diagram showing a configuration of a related art liquid crystal display.

Referring to FIG. 2, the related art liquid crystal display 100 includes a liquid crystal display panel 110 provided with a thin film transistor (TFT) driving the liquid crystal cell Clc at an intersection of data lines DL1 to DLm and gate lines GL1 to GLn crossing each other. A data driver 120 supplies data to the data lines DL1 to DLm of the liquid crystal display panel 110. A gate driver 130 supplies a scanning pulse to the gate lines GL1 to GLn of the liquid crystal display panel 110. A gamma reference voltage generator 140 generates a gamma reference voltage and supplies it to the data driver 120. A backlight assembly 150 irradiates a light onto the liquid crystal display panel 110. An inverter 160 applies an alternating current voltage and a current to the backlight assembly 150. A common voltage generator 170 generates a common voltage Vcom to supply it to the common electrode of the liquid crystal cell Clc of the liquid crystal display panel 110. A gate driving voltage generator 180 generates a gate high voltage VGH and a gate low voltage VGL and supplies them to the gate driver 130. A timing controller 190 controls the data driver 120 and the gate driver 130.

The liquid crystal display panel 110 has a liquid crystal injected between two glass substrates. On the lower glass substrate of the liquid crystal display panel 110, the data lines DL1 to DLm and the gate lines GL1 to GLn perpendicularly cross each other. Each intersection between the data lines DL1 to DLm and the gate lines GL1 to GLn is provided with the TFT. The TFT supplies a data on the data lines DL1 to DLm to the liquid crystal cell Clc in response to the scanning pulse. The gate electrode of the TFT is connected to the gate lines GL1 to GLn while the source electrode thereof is connected to the data line DL1 to DLm. The drain electrode of the TFT is connected to the pixel electrode of the liquid crystal cell Clc and to the storage capacitor Cst.

The TFT is turned-on in response to the scanning pulse applied, via the gate lines GL1 to GLn, to the gate terminal thereof. Upon turning-on of the TFT, a video data on the data lines DL1 to DLm is supplied to the pixel electrode of the liquid crystal cell Clc.

The data driver 120 supplies data to the data lines DL1 to DLm in response to a data driving control signal DDC supplied from the timing controller 190. The data driver 120 samples and latches a digital video data RGB fed from the timing controller 190, and then converts it into an analog data voltage capable of expressing a gray scale level at the liquid crystal cell Clc of the liquid crystal display panel 110 on the basis of a gamma reference voltage from the gamma reference voltage generator 140, thereby supplying it to the data lines DL1 to DLm.

The gate driver 130 sequentially generates a scanning pulse, for example, a gate pulse in response to a gate driving control signal GDC and a gate shift clock GSC supplied from the timing controller 190 to supply them to the gate lines GL1 to GLn. The gate driver 130 determines a high level voltage and a low level voltage of the scanning pulse in accordance with the gate high voltage VGH and the gate low voltage VGL supplied from the gate driving voltage generator 180.

The gamma reference voltage generator 140 is supplied with a power supply voltage of 0V to 3.3V supplied from a system mounted on the liquid crystal display 100, for example, a controller (not shown) of an image display apparatus such as a TV set to generate a positive gamma reference voltage and a negative gamma reference voltage and output them to the data driver 120.

The backlight assembly 150 is provided at the rear side of the liquid crystal display panel 110, and is radiated by an alternating current voltage and a current supplied from the inverter 160 to irradiate a light onto each pixel of the liquid crystal display panel 110.

The inverter 160 converts a square wave signal generated at the interior thereof into a triangular wave signal. The inverter 160 compares the triangular wave signal with a direct current power voltage VCC supplied from said system, thereby generating a burst dimming signal proportional to a result of the comparison. If the burst dimming signal determined in accordance with the rectangular wave signal at the interior of the inverter 160, then a driving integrated circuit (IC) (not shown) that controls a generation of the AC voltage and current within the inverter 160 controls a generation of AC voltage and current supplied to the backlight assembly 150 in response to the burst dimming signal.

The common voltage generator 170 receives a power supply voltage VCC from the system to generate a common voltage Vcom, and supplies it to the common electrode of the liquid crystal cell Clc provided at each pixel of the liquid crystal display panel 110.

The gate driving voltage generator 180 is supplied with a power supply voltage VCC of 3.3V supplied from the system to generate the gate high voltage VGH and the gate low voltage VGL, and supplies them to the gate driver 130. The gate driving voltage generator 180 generates a gate high voltage VGH more than a threshold voltage of the TFT provided at each pixel of the liquid crystal display panel 110 and a gate low voltage VGL less then the threshold voltage of the TFT. The gate high voltage VGH and the gate low voltage VGL generated in this manner are used to determine a high level voltage and a low level voltage of the scanning pulse generated by the gate driver 130, respectively.

The timing controller 190 supplies a digital video data RGB supplied from a digital video card (not shown) to the data driver 120, and generates a data driving control signal DDC and a gate driving control signal GDC using horizontal/vertical synchronization signals H and V in response to a clock signal CLK and supplies them to the data driver 120 and the gate driver 130, respectively. The data driving control signal DDC includes, for example, a source shift clock SSC, a source start pulse SSP, a polarity control signal POL and a source output enable signal SOE. The gate driving control signal GDC includes, for example, a gate start pulse GSP and a gate output enable signal GOE.

A structure of a color filter provided at a related art liquid crystal display having such a configuration and function will be described with reference to FIG. 3A to FIG. 3C.

Figure 3A:
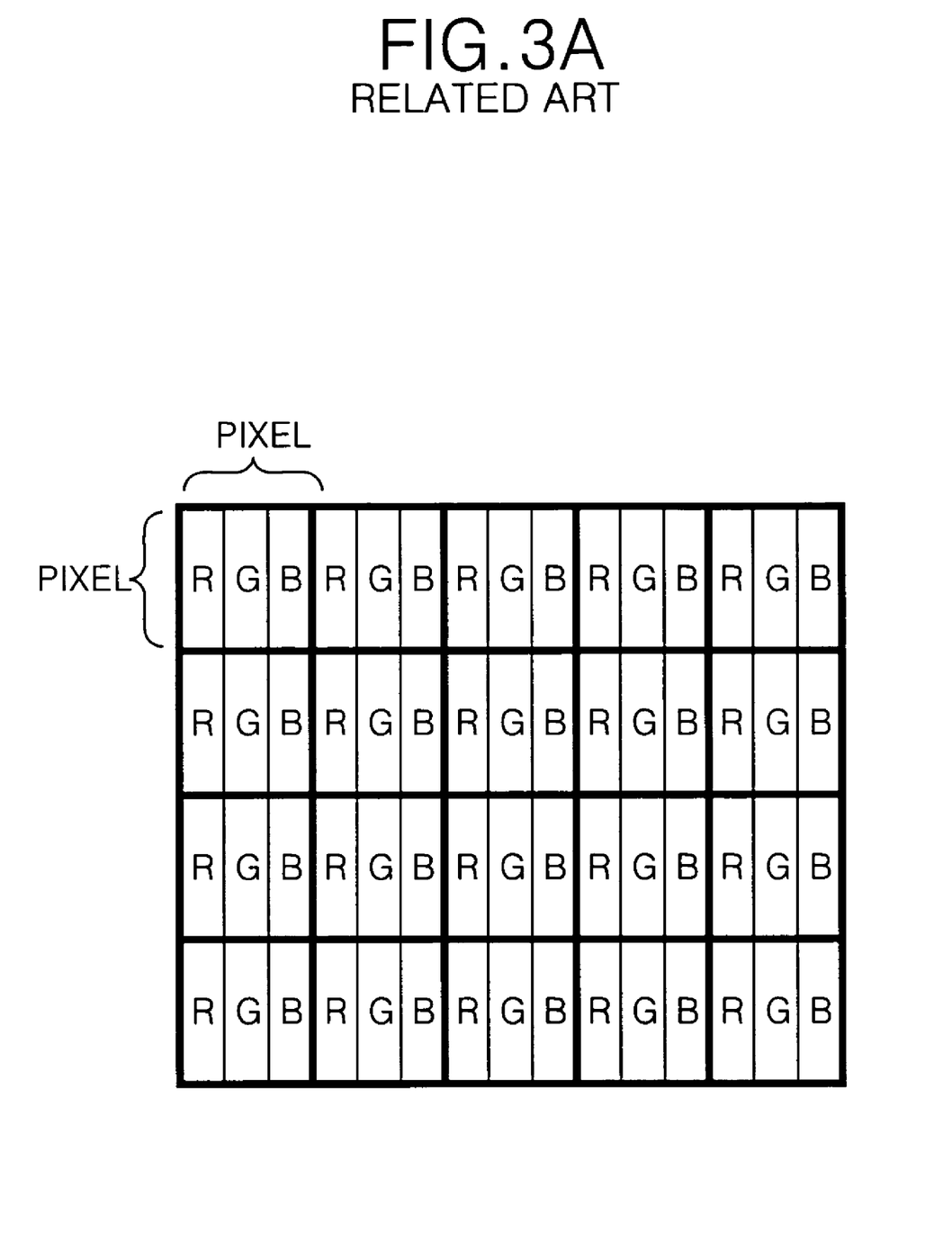
FIG. 3A to FIG. 3C are structure charts of a color filter of a related art liquid crystal display.

FIG. 3A is a structure chart of a color filter of a related art liquid crystal display, and exemplarily shows a structure of RGB color filters of each pixel provided on the liquid crystal display panel 110.

Referring to FIG. 3A, one of RGB color filters is formed at a plurality of pixels provided on the liquid crystal display panel 110, respectively. Such a pixel is comprised of three sub-pixels, for example, an R color filter, a G color filter and a B color filter. A thin film transistor TFT corresponds to each color filter formed on three sub-pixels.

Figure 3B:
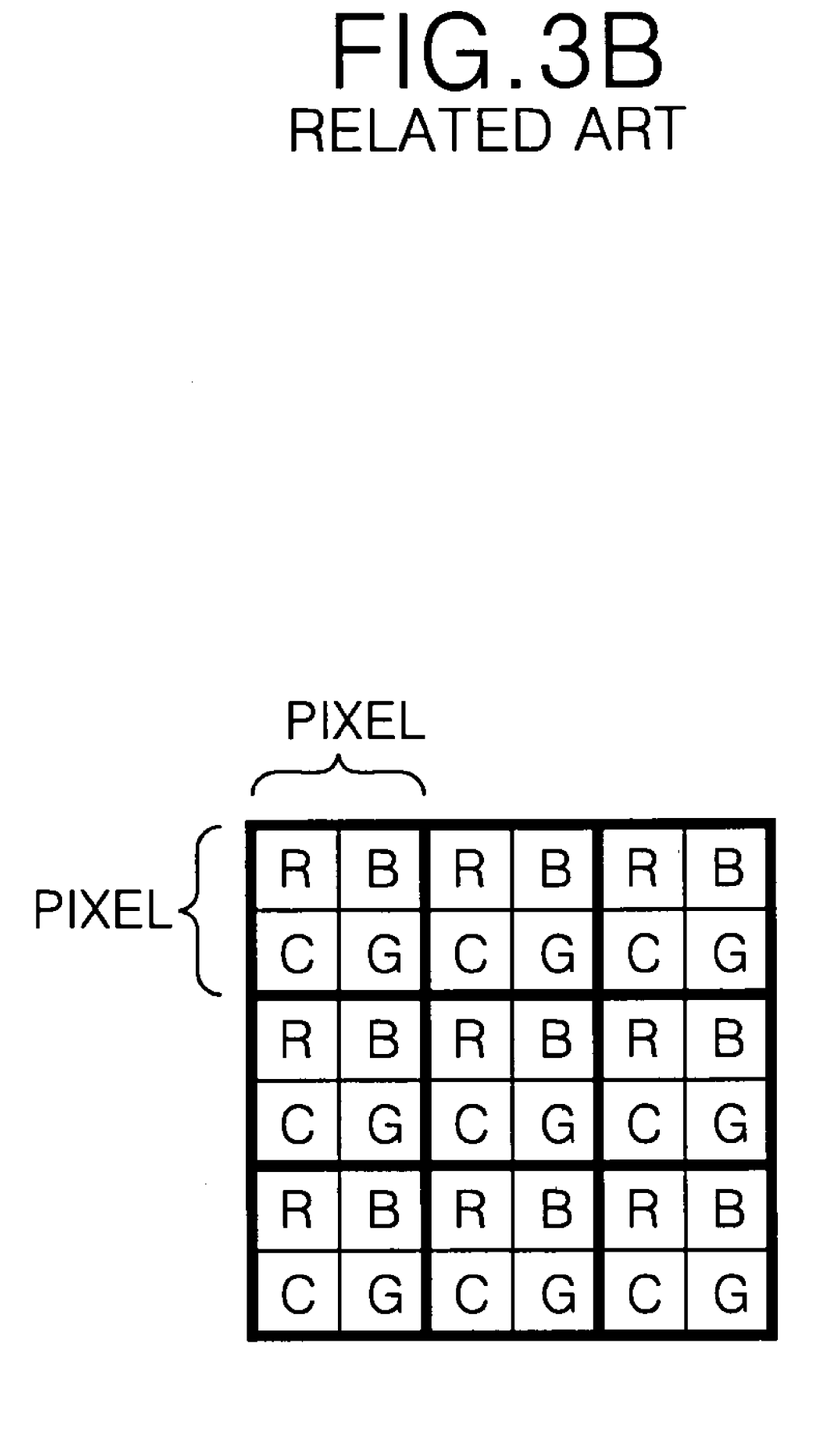

FIG. 3B is a structure chart of a color filter of a related art liquid crystal display, and exemplarily shows a structure of a RGB/C color filter of each pixel provided on the liquid crystal display panel 110.

Referring to FIG. 3B, one RGB/C color filter is formed at a plurality of pixels provided on the liquid crystal display panel 110, respectively. Such a pixel is comprised of four sub-pixels, for example, an R color filter, a G color filter, a B color filter and a C color filter. A thin film transistor TFT corresponds to each color filter formed on four sub-pixels.

Figure 3C:
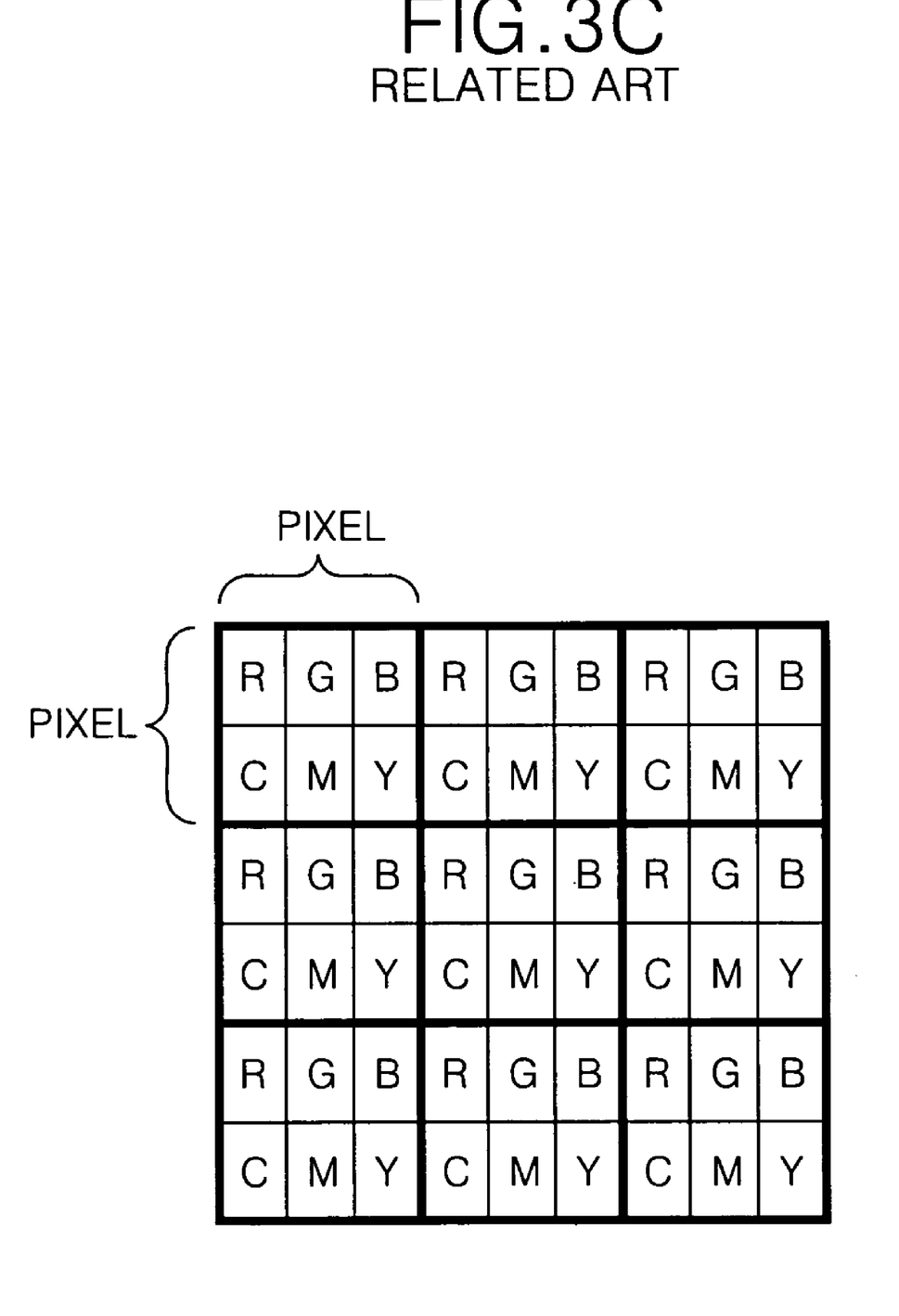

FIG. 3C is a structure chart of a color filter of a related art liquid crystal display, and exemplarily shows a structure of RGB/CMY color filters of each pixel provided on the liquid crystal display panel 110.

Referring to FIG. 3C, one of RGB/CMY color filters is formed at a plurality of pixels provided on the liquid crystal display panel 110, respectively. Such a pixel is comprised of six sub-pixels, for example, an R color filter, a G color filter, a B color filter, a C color filter, an M color filter and a Y color filter. A thin film transistor TFT corresponds to each color filter formed on six sub-pixels.

As described above, if RGB/C color filters or RGB/CMY color filters are used at a related art liquid crystal display, then four color filters or six color filters are formed at one pixel. The number of thin film transistor used at each pixel is increased. For example, if a RGB/C color filter is used, then four thin film transistors are formed in such a manner to correspond to each color filter at one pixel, and if RGB/CMY color filters are used, then six thin film transistors are formed in such a manner to correspond to each color filter at one pixel. As a result, an aperture ratio of each pixel is reduced in proportion to the number of thin film transistor, so that the brightness is reduced.

The present embodiments are related to an liquid crystal display. The present embodiments may obviate one or more of the limitations of the related art. For example, in one embodiment, a liquid crystal display separates and forms RGB color filters and CMY color filters at different pixels so that the brightness of each pixel is not reduced. In another example, in one embodiment the number of thin film transistors provided at each pixel is reduced, so that the aperture ratio of each pixel is increased.

In one embodiment, a liquid crystal display according comprises a liquid crystal display panel formed of a plurality of first pixels provided with RGB color filters and a plurality of second pixels provided with CMY color filters. A video processing part is inputted with RGB data to generate CMY data, and selectively outputs the RGB data in accordance with a clock signal and CMY data generated in accordance with a clock signal. A control part controls a supply of RGB data or CMY data inputted from the video processing part in accordance with the clock signal. A data driving part converts RGB data outputted from the control part or CMY data into an analog data in accordance with a control of the control part, and supplies it to the plurality of first pixel or the plurality of second pixel.

The video processing part includes a data processor that inputs RGB data to generate CMY data and to output RGB data and CMY data. A data supply controller controls a supply of RGB data and CMY data outputted from the data processor in accordance with the clock signal. A data selector selects RGB data or CMY data that is inputted from the data processor in accordance with a control of the data supply controller to output it to the control part.

In one embodiment of the liquid crystal display, the data processor generates a C data using a G data and a B data.

In one embodiment of the liquid crystal display, the data processor generates an M data using an R data and a B data.

In one embodiment of the liquid crystal display, the data processor generates a Y data using an R data and a G data.

In one embodiment, the data selector includes a first multiplexer that selects a R data inputted from the data processor or a C data in accordance with a control of the data supply controller to output it to the control part. A second multiplexer selects a G data or an M data inputted from the data processor in accordance with a control of the data supply controller to output it to the control part. A third multiplexer selects a B data or a Y data inputted from the data processor in accordance with a control of the data supply controller to output it to the control part.

In one embodiment of the liquid crystal display, if a low-level supply control signal is inputted from the data supply controller, then the first multiplexer selects and outputs a R data. In another embodiment, if a high-level supply control signal is inputted from the data supply controller, then the first multiplexer selects and outputs a C data.

In one embodiment of the liquid crystal display, if a low-level supply control signal is inputted from the data supply controller, then the second multiplexer selects and outputs a G data. In another embodiment, if a high-level supply control signal is inputted from the data supply controller, then the second multiplexer selects and outputs an M data.

In one embodiment of the liquid crystal display, if a low-level supply control signal is inputted from the data supply controller, then the third multiplexer selects and outputs a B data. In another embodiment, if a high-level supply control signal is inputted from the data supply controller, then the third multiplexer selects and outputs a Y data.

DETAILED DESCRIPTION

Figure 4:
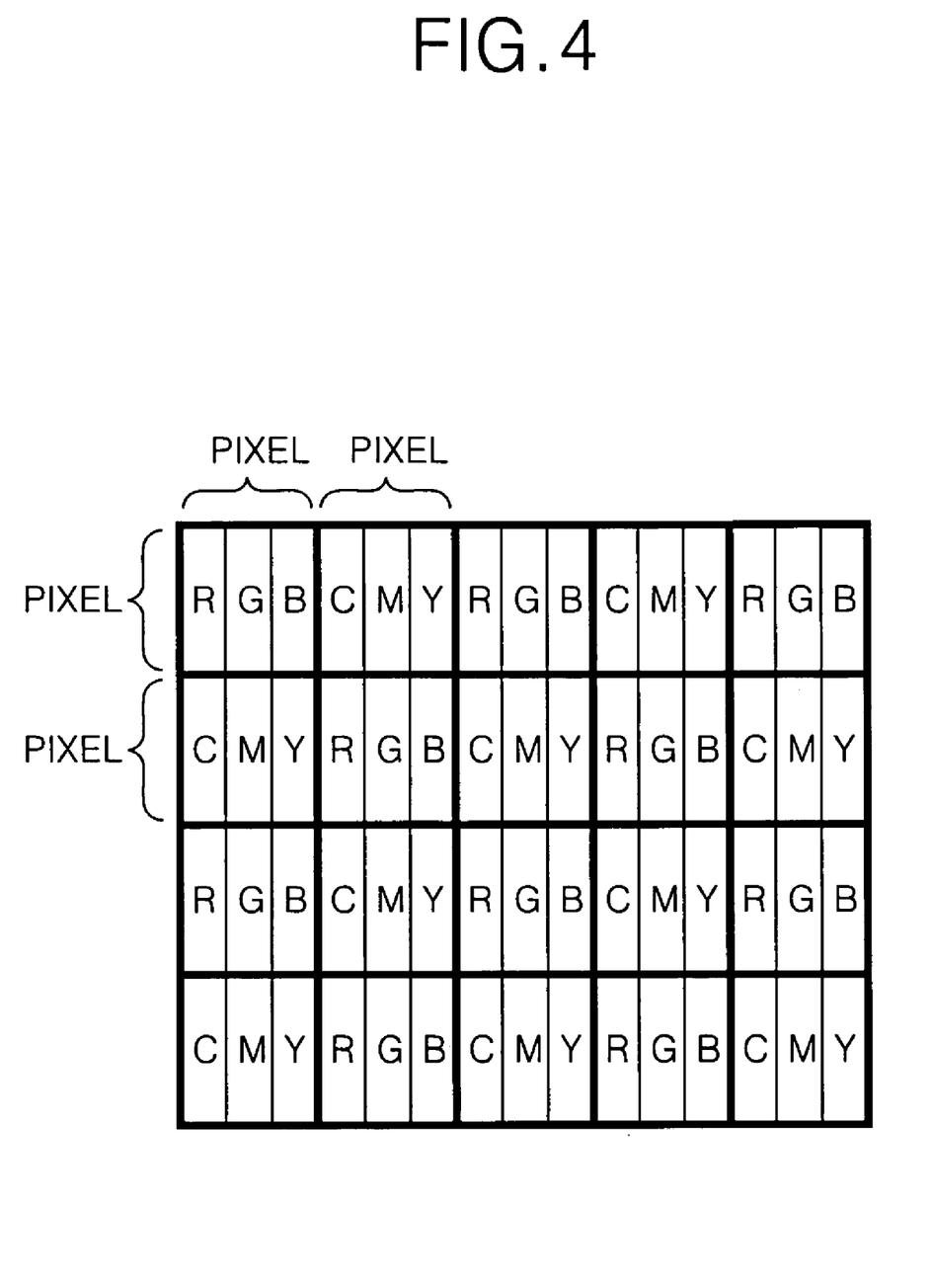
FIG. 4 is a structure chart of a color filter of a liquid crystal display according to one embodiment.

FIG. 4 is a structure chart of a color filter of a liquid crystal display according to one embodiment. For example, FIG. 4 shows a structure of RGB/CMY color filters of each pixel provided on the liquid crystal display panel 110.

In one embodiment, as shown in FIG. 4, RGB color filters and CMY color filters are separated and formed at a different pixels. For example, RGB color filters and CMY color filters are alternatively arranged along a horizontal direction, and are alternatively arranged along a vertical direction.

In one embodiment, a pixel having RGB color filters is comprised of three sub-pixels provided with a R color filter, a G color filter and a B color filter, respectively. A pixel having CMY color filters is comprised of three sub-pixels provided with a C color filter, an M color filter and a Y color filter. Alternatively, three thin film transistors TFT are formed in such a manner to correspond to a R color filter, a G color filter and a B color filter at a pixel provided with RGB color filters, and three thin film transistors TFT are formed in such a manner to correspond to a C color filter, an M color filter and a Y color filter at a pixel provided with CMY color filters.

In one embodiment, a pixel having RGB color filters and a pixel having CMY color filters is separated and formed to reduce the number of thin film transistor formed at each pixel by half. In this embodiment, it is possible to increase an aperture ratio of each pixel in proportion to the number of the reduced thin film transistor and to increase the effectiveness that the brightness is increased because an aperture ratio of each pixel is increased to about two.

In one embodiment, a liquid crystal display drives a pixel having RGB color filters and CMY color filters.

Figure 5:
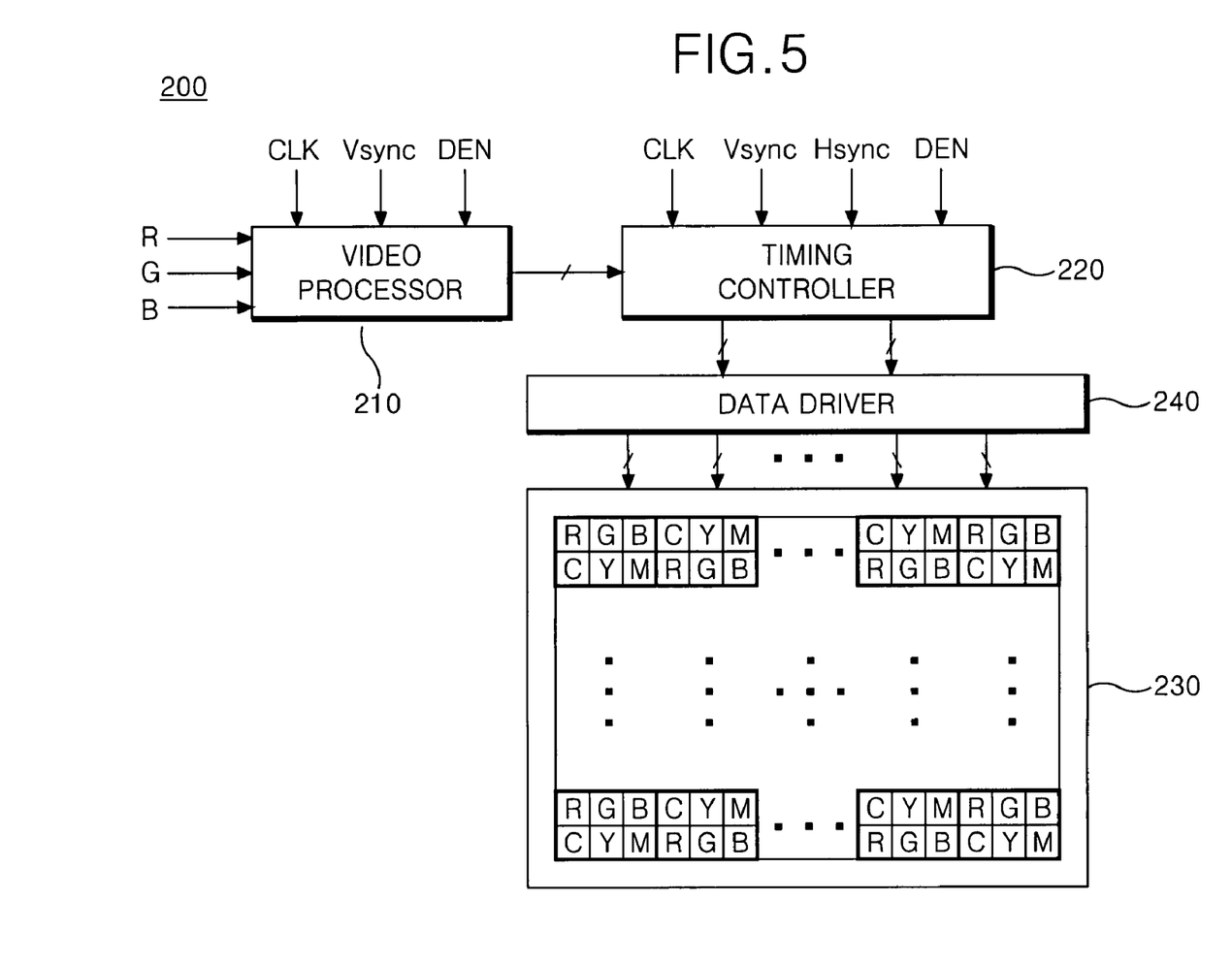
FIG. 5 is a block diagram showing a configuration of a liquid crystal display according to one embodiment.

FIG. 5 is a block diagram showing a configuration of a liquid crystal display according to the embodiment of the present invention. FIG. 5 omits a configuration element, for example, the gate driver 130, the gamma reference voltage generator 140, the backlight assembly 150, the inverter 160, the common voltage generator 170, and the gate driving voltage generator 180 in order to prevent an overlap with a content described in FIG. 2.

In one embodiment, as shown in FIG. 5, a liquid crystal display 200 includes a video processor 210, a timing controller 220, a liquid crystal display panel 230 and a data driver 240. The video processor is inputted with a R video data, a G video data, and a B video data and generates a C video data, an M video data, and a Y video data and selectively outputs RGB video data inputted in accordance with the inputted clock signal, and CMY video data generated in accordance with the inputted clock signal.

In one embodiment, the timing controller 220 controls a supply of RGB video data or CMY video data inputted from the video processor 210 in accordance with the inputted clock signal. The liquid crystal display panel 230 includes a pixel formed RGB color filters and a pixel formed CMY color filters. And the data driver 240 converts a digital RGB video data or CMY video data inputted from the timing controller 220 into an analog data in accordance with a control of the timing controller 220 to supply it to the liquid crystal display panel 230.

In one embodiment, the video processor 210 recognizes that one frame that displays at the liquid crystal display panel 110 is started if a vertical synchronization signal Vsync is inputted. The video processor 210 recognizes that RGB video data is inputted via the data enable signal DEN if a data enable signal DEN is inputted and, at the same time, a R video data, a G video data and a B video data are inputted. The video processor 210 generates a C video data, an M video data, and a Y video data using the inputted R video data, the inputted G video data, and the inputted B video data. The video processor 210 outputs RGB data or CMY data in accordance with a clock signal CLK if CMY video data are generated.

The timing controller 220 adjusts a vertical synchronization and a horizontal synchronization of a frame in accordance with the inputted vertical synchronization Vsync signal and a horizontal synchronization signal Hsync, and outputs RGB video data inputted from the video processor 210 or CMY video data to the data driver 240 in accordance with a clock signal CLK and controls a supply of RGB video data supplied on the liquid crystal display panel 230 or CMY video data.

In one embodiment, the timing controller 220 recognizes that a RGB video data or CMY video data is inputted via the data enable signal DEN. The timing controller 220 recognizes that an effective data is inputted if a high-level data enable signal DEN is inputted, while the timing controller 220 recognizes that a data is not inputted if a low-level data enable signal DEN is inputted.

In one embodiment, a pixel provided with RGB color filters and a pixel provided with CMY color filters, as shown in FIG. 4, are formed at the liquid crystal display panel 230. A pixel provided with RGB color filters is supplied with RGB video data from the data driver 240. A pixel provided with CMY color filters is supplied with CMY video data from the data driver 240.

In one embodiment, the data driver 240 supplies RGB video data inputted from the timing controller 220 to a pixel provided with RGB color filters. The data driver 240 supplies CMY video data inputted from the timing controller 220 to a pixel provided with CMY color filters in accordance with a control of the timing controller 220.

Figure 6:
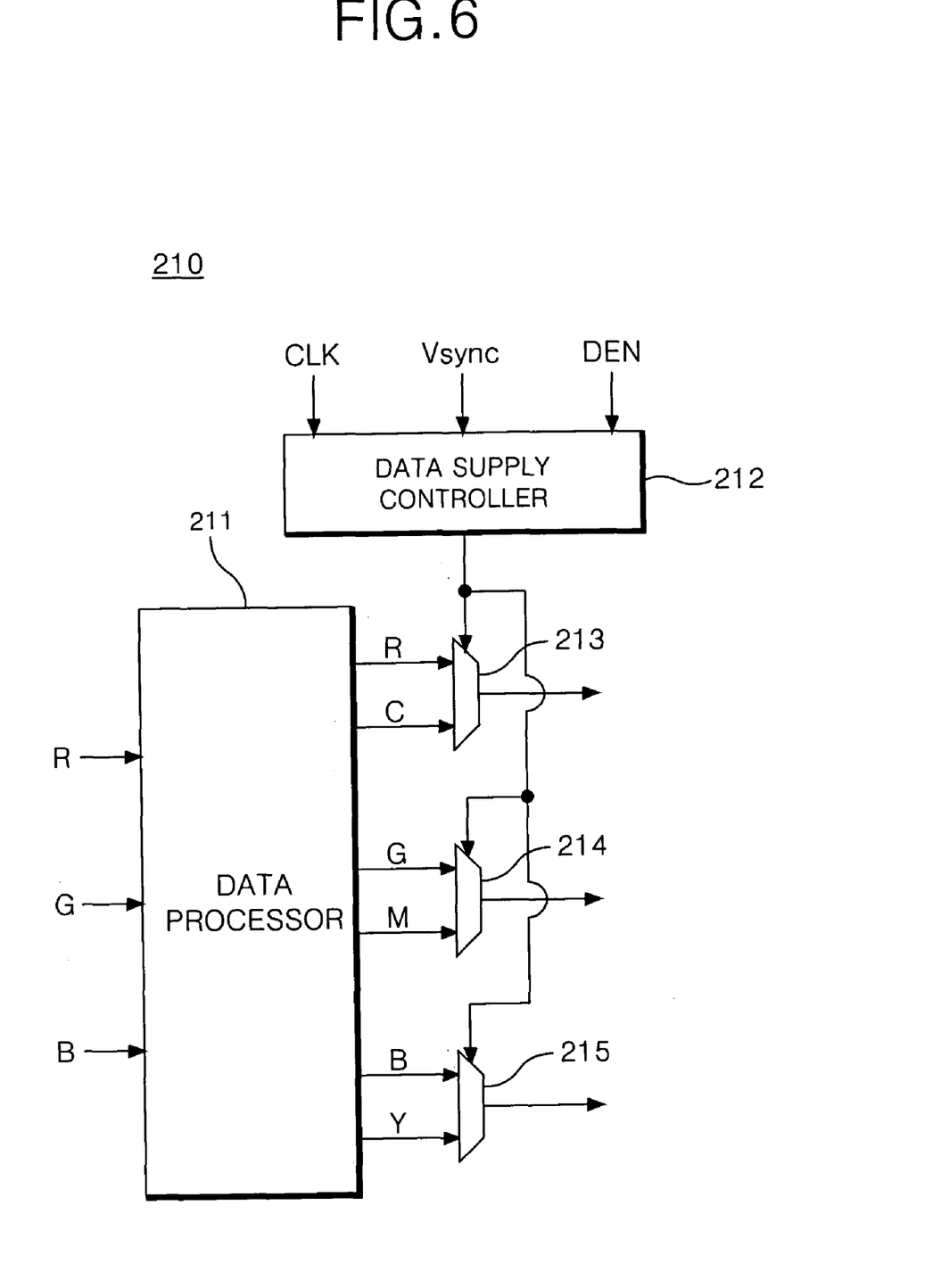
FIG. 6 is a block diagram showing a configuration of the video processor provided at a liquid crystal display according to one embodiment.

FIG. 6 is a block diagram showing a configuration of the video processor provided at a liquid crystal display according to one embodiment.

In one embodiment, as shown in FIG. 6, the video processor 210 includes a data processor 211, a data supply controller 212, a first multiplexer 213, a second multiplexer 214, and a third multiplexer 215. The data processor 211 is inputted with an R video data, a G video data, and a B video data to generate a C video data, an M video data, and a Y video data, and outputs the inputted RGB video data and the generated CMY video data.

In another embodiment, the data supply controller 212 controls a supply of RGB video data and CMY video data inputted from the data processor 211 in accordance with a clock signal. The first multiplexer 213 selectively outputs an R data or a C data inputted from the data processor 211 in accordance with a control of the data supply controller 212. The second multiplexer 214 selectively outputs a G data or an M data inputted from the data processor 211 in accordance with a control of the data supply controller 212. The third multiplexer 215 selectively outputs a B data or a Y data inputted from the data processor 211 in accordance with a control of the data supply controller 212.

In one embodiment, the data processor 211 generates a C video data using a G video data and a B video data, generates an M video data using an R video data and a B video data, and generates a Y video data using an R video data and a G video data if RGB video data is inputted. In this embodiment, if CMY video data is generated, then the data processor 211 outputs an R video data and a C video data to two input terminals of the first multiplexer 213, outputs an G video data and an M video data to two input terminals of the second multiplexer 214, and outputs an B video data and a Y video data to two input terminals of the third multiplexer 215.

In one embodiment, the data supply controller 212 recognizes that one frame that displays at the liquid crystal display panel 110 is started if a vertical synchronization signal Vsync is inputted, and the data supply controller 212 recognizes that RGB video data and CMY video data are inputted to the first to third multiplexers 213, 214 and 215 if a high-level data enable signal DEN is inputted. The data supply controller 212 outputs a high-level supply control signal or a low-level supply control signal to control terminals of the first to third multiplexers 213, 214 and 215 in accordance with a clock signal CLK if a start of a frame and an input of a video data are recognized.

In one embodiment, the first multiplexer 213 selects any one data of an R video data and a C video data inputted from the data processor 211 and outputs it to the timing controller 220 in accordance with a supply control signal inputted from the data supply controller 212 to a control terminal. For example, if a low-level supply control signal is inputted to a control terminal, then the first multiplexer 213 selects a R video data to output it to the timing controller 220. In another example, if a high-level supply control signal is inputted to a control terminal, then the first multiplexer 213 selects a C video data and outputs it to the timing controller 220.

In one embodiment, the second multiplexer 214 selects any one data of a G video data and an M video data inputted from the data processor 211 and outputs it to the timing controller 220 in accordance with a supply control signal inputted from the data supply controller 212 to a control terminal. For example, if a low-level supply control signal is inputted to a control terminal, then the second multiplexer 214 selects a G video data and outputs it to the timing controller 220. In another example, if a high-level supply control signal is inputted to a control terminal, then the second multiplexer 214 selects an M video data and outputs it to the timing controller 220.

In one embodiment, the third multiplexer 215 selects any one data of a B video data and a Y video data inputted from the data processor 211 and outputs it to the timing controller 220 in accordance with a supply control signal inputted from the data supply controller 212 to a control terminal. For example, if a low-level supply control signal is inputted to a control terminal, then the third multiplexer 215 selects a B video data to output it to the timing controller 220. In another example, if a high-level supply control signal is inputted to a control terminal, then the third multiplexer 215 selects a Y video data and outputs it to the timing controller 220.

In one embodiment, RGB color filters and CMY color filters are separated and formed at a different pixel, respectively, to thereby reduce the number of thin film transistor provided at each pixel. In this embodiment, for example, an aperture ratio of each pixel is increased, so that it becomes possible to increase brightness.

Although the present invention has been explained by various embodiments shown in the drawings described above, it should be understood to the ordinary skilled person in the art that the invention is not limited to the illustrated and described embodiments, but rather that various changes or modifications thereof are possible without departing from the spirit of the invention. Accordingly, the scope of the invention shall be determined only by the appended claims and their equivalents.

What is claimed is:

1. A liquid crystal display, comprising:

a liquid crystal display panel including a plurality of first pixels and a plurality of second pixels, wherein each of the first pixels have Red, Green anc Blue (RGB) sub-pixels provided with RGB color filters, respectively, and each of the second pixels have Cyan, Magenta and Yellow (CMY) sub-pixels provided with CMY color filters, respectively, for displaying color and wherein the first pixels and the second pixels are alternatively arranged along a horizontal direction and are alternatively arranged along a vertical direction;

a video processing part generating CMY data using input RGB data and outputting RGB data or CMY data;

a timing controller controlling a supply of RGB data or CMY data inputted from the video processing part; and a data driving part converting RGB data or CMY data outputted from the timing controller into an analog data in accordance with the timing controller, and supplying it to the plurality of first pixels or the plurality of second pixels, wherein the video processing part includes:

a data processor generating CMY data using input RGB data and outputting RGB data and CMY data;

a data supply controller supplying a supply control signal in accordance with a clock signal, if the data supply controller recognizes a start of a frame by a vertical synchronization signal inputted and an input of the RGB and CMY data by a data enable signal inputted; and a data selector selecting RGB data or CMY data inputted from the data processor in accordance with the supply control signal inputted from the data supply controller to output it to the timing controller, wherein the data selector includes:

a first multiplexer selecting a R data or a C data inputted from the data processor in accordance with the supply control signal to output it to the timing controller;

a second multiplexer selecting a G data or a M data inputted from the data processor in accordance with the supply control signal to output it to the timing controller; and a third multiplexer selecting a B data or a Y data inputted from the data processor in accordance with the supply control signal to output it to the timing controller, wherein the data supply controller recognizes that one frame for displaying at the liquid crystal display panel is started if a vertical synchronization signal Vsych is inputted, and the data supply controller recognizes that RGB video data and CMY video data are inputted to the first to third multiplexers if a high-level data enable signal is inputted, wherein if a low-level supply control signal is inputted from the data supply controller, the first, second and third multiplexers select and output RGB data, respectively, and wherein if a high-level supply control signal is inputted from the data supply controller, the first, second and third multiplexers select and output CMY data, respectively.

2. The liquid crystal display as claimed in claim 1, wherein the data processor generates the C data using the G data and the B data, generates the M data using the R data and the B data and generates the Y data using the R data and the G data.

3. A method for operating a liquid crystal display device, the liquid crystal display device comprising a data processor, a data supply controller, a first multiplexer, a second multiplexer, and a third multiplexer, the method comprising:

inputting a R video data, a G video data, and a B video data into the data processor;

generating a C video data, an M video data, and a Y video data using the data processor; and outputting the inputted RGB video data or the generated CMY video data in accordance with a control of the data supply controller, wherein the liquid crystal display panel includes a first pixel having Red, Green anc Blue (RGB) sub-pixels provided with RGB color filters, respectively, and a second pixels having Cyan, Magenta and Yellow (CMY) sub-pixels provided with CMY color filters, respectively, for displaying color and wherein the first pixel and the second pixel are alternatively arranged along a horizontal direction and are alternatively arranged along a vertical direction, wherein the data supply controller supplies a supply control signal in accordance with a clock signal, if the data supply controller recognizes a start of a frame by a vertical synchronization signal inputted and an input of the RGB and CMY data by a data enable signal inputted, and a first multiplexer selecting a R video data or a C video data inputted from the data processor in accordance with the supply control signal inputted from the data supply controller to output it to the timing controller;

a second multiplexer selecting a G video data or a M video data inputted from the data processor in accordance with the supply control signal to output it to the timing controller; and a third multiplexer selecting a B video data or a Y video data inputted from the data processor in accordance with the supply control signal to output it to the timing controller, wherein outputting the RGB or CMY video data comprises selecting RGB video data to output it to the timing controller if a low-level supply control signal is inputted to the first, second and third multiplexers, or selecting CMY video data to output it to the timing controller if a high-level supply control signal is inputted to the first, second and third multiplexers.

4. The method for operating a liquid crystal display device according to claim 3, further comprising generating the C video data using the G video data and the B video data, generating the M video data using the R video data and the B video data, or generating the Y video data using the R video data and the G video data if RGB video data is inputted.

* * * * *